(12) United States Patent
Citak

(10) Patent No.: US 11,013,215 B2
(45) Date of Patent: May 25, 2021

(54) TOY FOR PETS, PARTICULARLY FOR DOGS

(71) Applicant: Andrzej Citak, Raasdorf (AT)

(72) Inventor: Andrzej Citak, Raasdorf (AT)

(*) Notice: Subject to any disclaimer, the term of this patent is extended or adjusted under 35 U.S.C. 154(b) by 316 days.

(21) Appl. No.: 16/082,014

(22) PCT Filed: Feb. 23, 2017

(86) PCT No.: PCT/AT2017/060044
§ 371 (c)(1),
(2) Date: Sep. 4, 2018

(87) PCT Pub. No.: WO2017/147633
PCT Pub. Date: Sep. 8, 2017

(65) Prior Publication Data
US 2020/0337268 A1    Oct. 29, 2020

(30) Foreign Application Priority Data

Mar. 4, 2016 (AT) .............................. A 50174/2016

(51) Int. Cl.
*A01K 15/02* (2006.01)
(52) U.S. Cl.
CPC ................................ *A01K 15/025* (2013.01)
(58) Field of Classification Search
CPC . A01K 15/025; A63F 9/0601; A63F 119/707; A63H 33/00; G09B 23/00; G09B 1/00; G09B 23/06–10
USPC ...................................... 446/1, 475; 119/707
See application file for complete search history.

(56) References Cited

U.S. PATENT DOCUMENTS

| 4,108,517 A | 8/1978 | Tomalinas, Jr. et al. |
| 4,574,822 A | 3/1986 | Helinsky |
| 2011/0253059 A1* | 10/2011 | Wong ..................... A01K 15/02 119/702 |

FOREIGN PATENT DOCUMENTS

| CN | 202190625 U | 4/2012 |
| GB | 2488379 A | 8/2012 |

* cited by examiner

*Primary Examiner* — Peter M Poon
*Assistant Examiner* — Kari A Bradberry
(74) *Attorney, Agent, or Firm* — Laurence A. Greenberg; Werner H. Sterner; Ralph E. Locher

(57) ABSTRACT

A toy for improving an intelligence of dogs has a hollow prism body of trapezoidal cross section on a base plate. Lateral surface panels that rise up obliquely from the base panel are formed apertures beneath which it is possible to place a reachable dog treat. The prism body is delimited on either side by vertical flank panels, which project beyond the lateral-surface panels of the prism body at a constant projection height and which are formed with a guide channel along the lateral surface panels. A plurality of adjacent rollers project into the guide channels and they are movable along the channel. The rollers cover one of the lateral-surface panels and at least one aperture formed therein. The dog can shift the rollers from one lateral surface panel across an apex to the opposite later surface panel so as to expose the apertures and reach for the treat.

14 Claims, 5 Drawing Sheets

TOY FOR PETS, PARTICULARLY FOR DOGS

BACKGROUND OF THE INVENTION

Field of the Invention

The present invention is a novel toy for the encouragement of the intelligence of pets, particularly of dogs, which consists of a central structure in which small, tasty edible rewards for the dog, so-called "treats", can be placed.

There is already a wide variety of seek-and-find games and toys for pets available, in particular dogs, which can provide playful activity for the pet and in addition have improved learning or training effects. Such toys are usually constructed very simply and reward the pet once it has been successful with an edible reward, usually in the form of small treats. Games of this kind available on the market are usually straightforward and set along the lines of a simple trial-and-error principle. However, they are limited in their learning effect on the pet. Usually such well-known games and other toys provide few or no variations in play, which means that that the animal does not sustain long-term interest and the game or toy is "played" only for a short while.

SUMMARY OF THE INVENTION

The object and goal of the present invention is to create a new game or toy for dogs that does not feature the disadvantages of existing games as mentioned above and keeps the dog's interest over a longer time, and in addition offers a high and often growing level of effective learning.

The body of this invention is a game of the kind already mentioned above, characterized by the following:
- a hollow prism made of several shell plates and substantially a triangular, trapezoid or cylindrical vertical shape which stands on an even base plate. These shell plates or parts thereof slope upwards from the base plate and feature at least one recess. Beneath it there is a surface or floor on which one of the edible rewards ("treats") that the dog likes and can get to can be placed;
- the prism is restricted on two sides by vertical flanking plates which run parallel to each other. Each of their protruding inside surfaces features a channel-like opening that essentially follows the same direction as the shell plates or parts thereof. With their end pieces pointing inward, both of these recesses feature sticks, bars and particularly cylinders that have been arranged lengthwise. These cover at least one of the recesses to be found in the shell plates or parts thereof. By moving, in particular pushing, these across the pyramid's peak formed by the shell plate to the shell plate or its parts on the other side, the dog smelling the edible reward reveals at least one recess and the edible reward inside or beneath.

In regard to the dog's game's components described above as recesses, two types of application have proved to be particularly good.

One excels in that these recesses are shaped as continuous grooves carved into the surfaces of the flank plates and follow the external contour of the two shell plates or parts thereof across the peak plate or a particular part thereof. Sticks, bars and particularly cylinders are placed in these with dowels at both ends and can be inserted and moved within these grooves.

The other type of application is outstanding because of the way the two channels as well the two inner surfaces of the flank plates and the cover strips at the edge are fitted with profile strips. This means that the sticks, bars and particularly cylinders at both ends of the channels can move through the circular discs placed at the ends leaning against the prism's shell plates.

A somewhat easier level of the game can be achieved particularly because on both sides the channels or grooves for the sticks, bars and particularly cylinders are placed at a particular vertical distance from the base plate, so that for instance the paw of the dog playing the game will fit into the gap between the channel and the base plate.

The dog's understanding of the function of the new game can be brought to a higher level because the amount of sticks, bars and particularly cylinders can be set so that when placed lengthwise alongside each other, they cover one of the prism's two sloping shell plates or parts thereof and thus the recesses located there.

Here it has proven to be particularly effective if the cross-sectional shape of the sticks, bars and particularly cylinders is either circular or polygonal, especially if at least octagonal.

A further advantage is achieved by ensuring that the channels or grooves maintain the same width, depth and cross-sectional shape throughout their course.

It is of particular advantage here if the cross-sectional shapes of the grooves are mainly shaped either rectangular or semi-circular.

In terms of this invention, it is particularly advantageous for the new game for dogs to contain at least one prominent, preferably axial smell channel included in a dowel or knob used to cover at least one of the recesses in the shell plates. Such a dowel or knob makes it possible to block moving or pushing the sticks, bars and particularly cylinders. Therefore the dog has to remove this dowel first in order to move the sticks, bars and particularly cylinders to reveal the recess containing at least one edible reward.

Another way to increase the intelligence challenges facing the dog through its efforts at the game is the variation featuring two additional drawers at the flank plates that can be pulled out, for instance with a loop, and which also contain an edible reward. These can be blocked by placing dowels or knobs in the base plate, so that the drawers can only be pulled out once the dog has removed these dowels or knobs. Only then can it reach the edible reward kept within.

Finally it is recommended that when setting the new game to all variations and particularly for increasing its levels, the recesses for the dowels in the base plate, the peak plate and/or the flank plates are fitted with undercuts in order to hold in place the dowels or knobs used for closing or blocking. Only a small part of these recesses should not feature undercuts, and only after the removal of the dowel or knob by the dog can the particular drawer pulled out of the flank plate and reach the edible reward kept there.

BRIEF DESCRIPTION OF THE SEVERAL VIEWS OF THE DRAWING

The invention is described in greater detail in the drawings.

DESCRIPTION OF THE INVENTION

Figure 1:
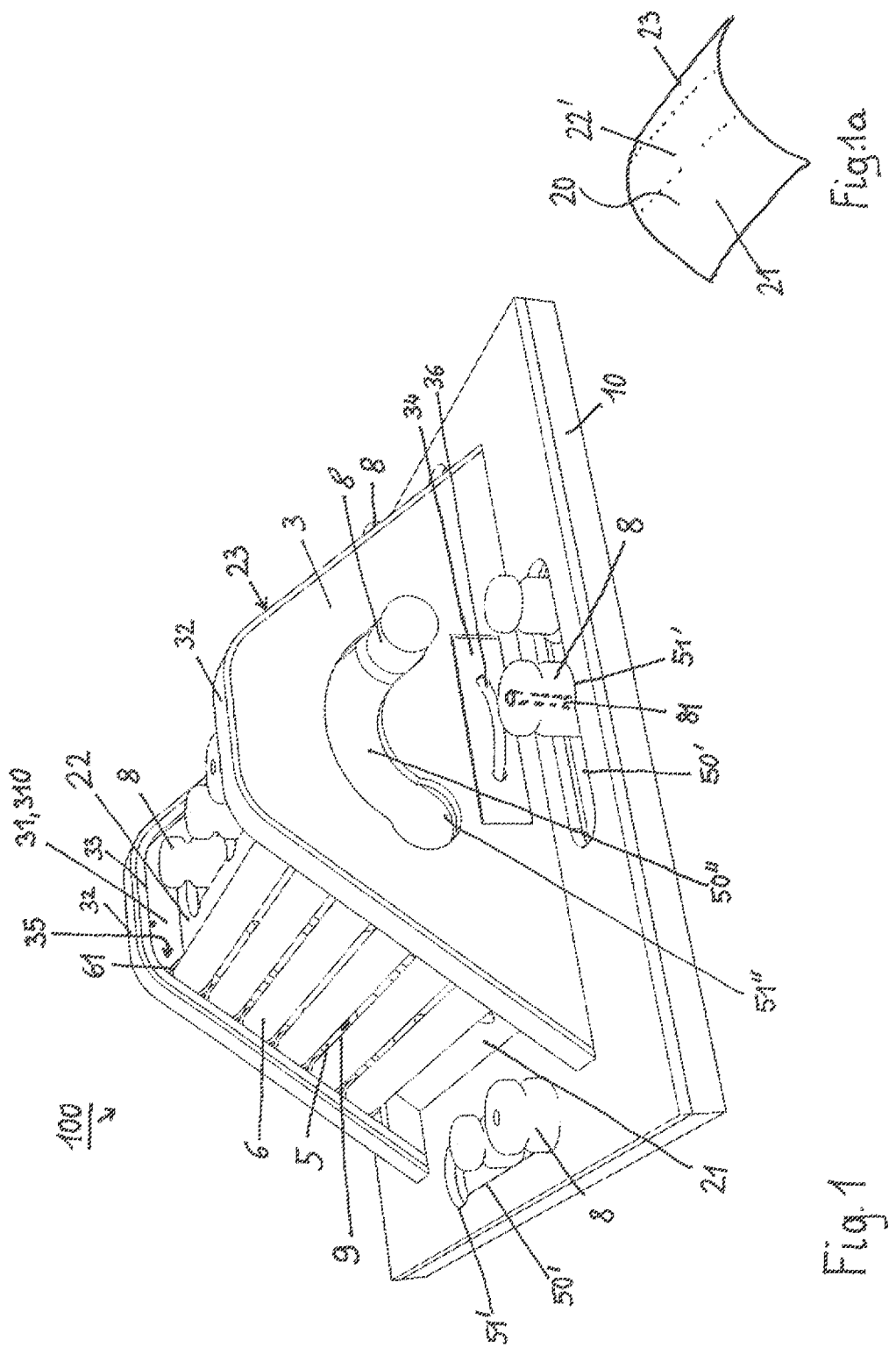
FIG. 1 shows the new game for dogs at an angle, the sketch in FIG. 1a is a variation of the game shown in FIG. 1.

Game 100 shown in FIG. 1 essentially consists of prism 20 placed on base plate 10 with a symmetrical trapezoid cross-section. The shell of prism 20 is formed by shell plates 21, 23, which are sloped at the same angle to base plate 10. Peak plate 22, which runs parallel to base plate 10, connects the two shell plates.

On both sides of the prism body 20, the two shell plates 21, 23 feature recesses 5. Here those on "front" shell plate 21 are nearly completely covered by six identical cylinders 6 lying next to each other, with very small gaps between them. No cylinders are placed on the other, second diagonal shell plate 23 and peak plate 22.

The cylinders 6 feature discs 61 at both ends. These are circular and larger all around. With these end discs 61 the rollers are "hung" into channels 35 of flank plates 2 and can inserted further into these. The channels are situated between the two flank plates and face each other.

The channels 35 essentially follow the contour of the outer surfaces of shell plates 21, 22 and 23 and show no inconsistencies. Here, the cylinders 6 can singly or severally be pushed from the side of shell plate 21 across peak plate 22 to, or even over, shell plate 23, which is not directly visible on FIG. 1. From here gravity causes them to roll down and eventually cover—once again essentially lying alongside each other lengthwise—shell plate 23 on the other side and its recesses 5.

Channels 35 for the cylinders 6 are formed by inside surfaces 310 of the flank plates, protrusions 31, cover strips 32, which are essentially at their upper edge and always protruding above each other, and profile strips 33, which undercut end discs 61 of cylinders 6.

FIG. 1 also shows how altogether three dowels 8 are placed in a recess in peak plate 22, which initially make it impossible for the dog to reach even just one of recesses 5 in shell plate 2, on whose floor 52 an edible reward 9 is placed, although it can clearly smell the treat through the narrow gaps between cylinders 6. It is forced to first "remove" the locking dowels 8—here it is even three of them—with one of its paws so that only afterwards it can push cylinders 6 across peak plate 22, either one by one or as several at once, onto or over opposite shell plate 23. Then it can finally gain access to at least one of the recesses 5 and edible rewards 9.

It should be added here that one of the three dowels 8 in the oblong recess 50 on peak plate 22 features a central, axially continuously running smell channel 81. Through this the dog can smell the edible reward 9 locked into recess 5 by dowel 8, which stimulates it to reach the edible reward hidden beneath.

With essentially the same function, boomerang-shaped recesses 50" have been inserted in flank plates 3, with a dowel 8 placed where it is held by the undercut of recess 50". Only after moving dowel 8 into the recesses' circular extension 51", which features no undercutting, can the dog release dowel 8 from its position though recess 50".

In regard to dowels 8 in the linear-oblong recesses 50' in base plate 10, which run parallel to recess 50, one of these on the front side serves to prevent drawer 34 and its drawing loop 36, which have been inserted into flank plate 3, from being pulled out. Drawer 34 contains an edible reward 9, which the dog can of course smell.

The dog must first remove dowel 8 from the undercut part 51' of recess 50', beneath which a treat is hidden. Only then can it pull out drawer 34 by its loop 36 to get to the other edible rewards placed there, which it has already been able to smell.

This essentially applies to all oblong recesses 5, 50, 50', 50" with extensions 5', 51, 51', 51".

With all identifying numbers and descriptions remaining the same, FIG. 1 a shows an only sketch-like rounded of prism 20 with a single shell plate and the according shell plate parts 21', 22', 23' instead of the whole shell plates 21 and 23 and peak plate 22 as shown in FIG. 1.

Figure 2:
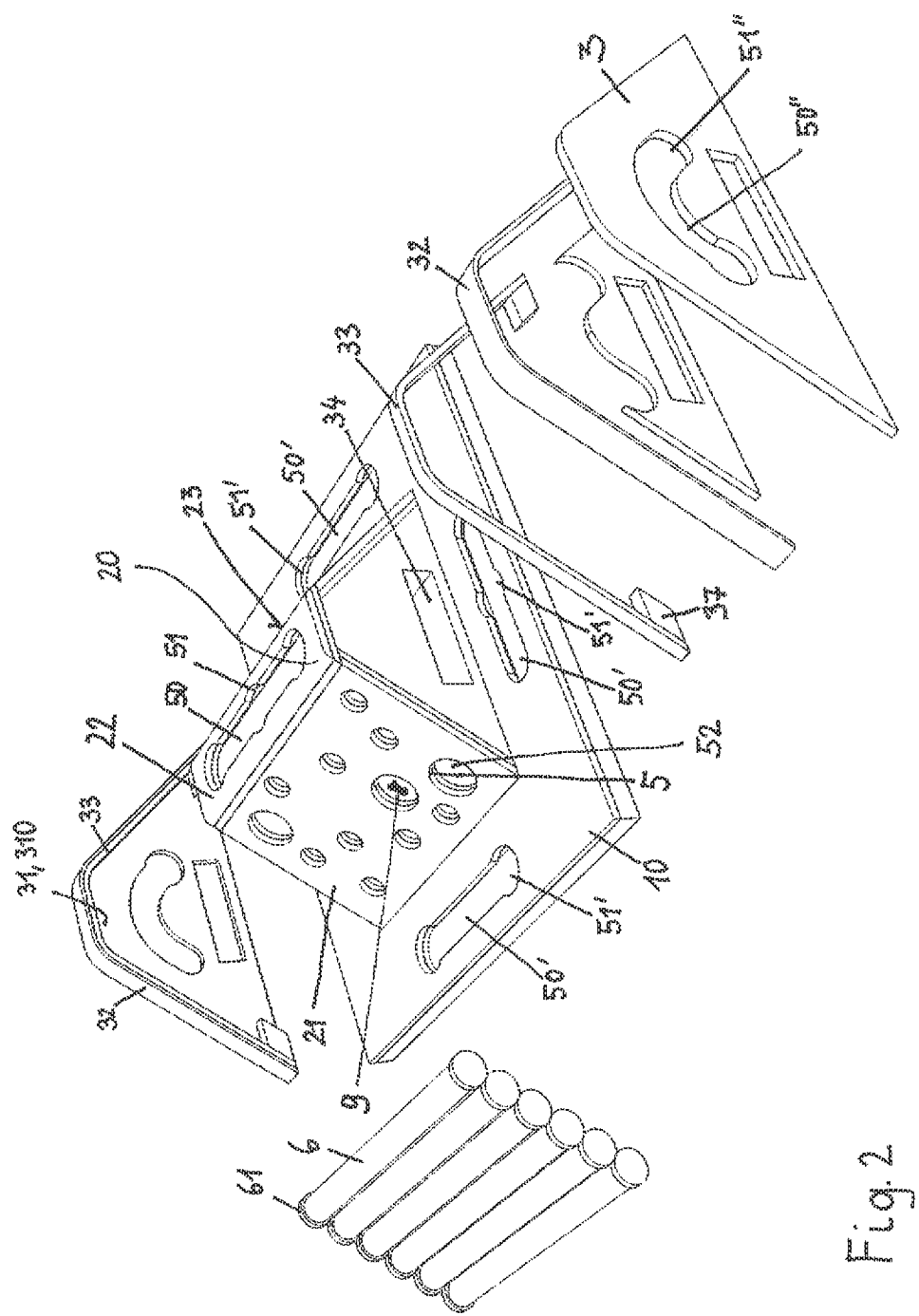
FIG. 2 is an exploded diagram of the game with its individual components, FIG. 3 a view from above, FIG. 4 a frontal view and FIG. 5 view of the named game from the other side. One knob each has been placed in the two recesses of the front shell plate.

With all identifying numbers and descriptions remaining the same, the exploded diagram in FIG. 2 shows a variation of the new game for dogs 100: prism 20, base plate 10, shell plates 21, 23—which feature recesses 5, here shaped circular, in which at least one edible reward 9 can be placed—and peak plate 22 connecting the two as well as the two flank plates 3.

An edible reward 9 for the dog can be placed beneath at least one of recesses 5.

Peak plate 22 features an oblong recess 50 for a dowel with an undercut circular extension 51. One or more dowels 8—whose removal is blocked—can be stored in the undercut areas.

If the dog pushes one of the locking dowels 8 into a circular extension 51 with no undercut, it can eventually remove this dowel 8 and push cylinders 6 from the side of shell plate 21 across peak plate 22 onto or across the other shell plate 23. This enables it to open shell plate 21 and its recesses 5.

FIG. 2 also shows cover strips 32, which always protrude inwards and towards each other from the upper edge of flank plates 3. The undercut strips 33 are attached to cover strips 32 and point downwards. Together with the protruding inner surfaces 310 of flank plates 3 they form one undercut channel 35 on each side. The individually movable cylinders 6 can be "hung into" these channels with discs 61 at both ends and can be moved.

Finally, FIG. 2 also shows the lower vertical distance holder 37 attached on the inside of the undercut strips 32 mentioned above. This ensures that a dog's paw can reach beneath the lowest cylindrical roller in order to move all the cylinders stacked above.

Figure 3:
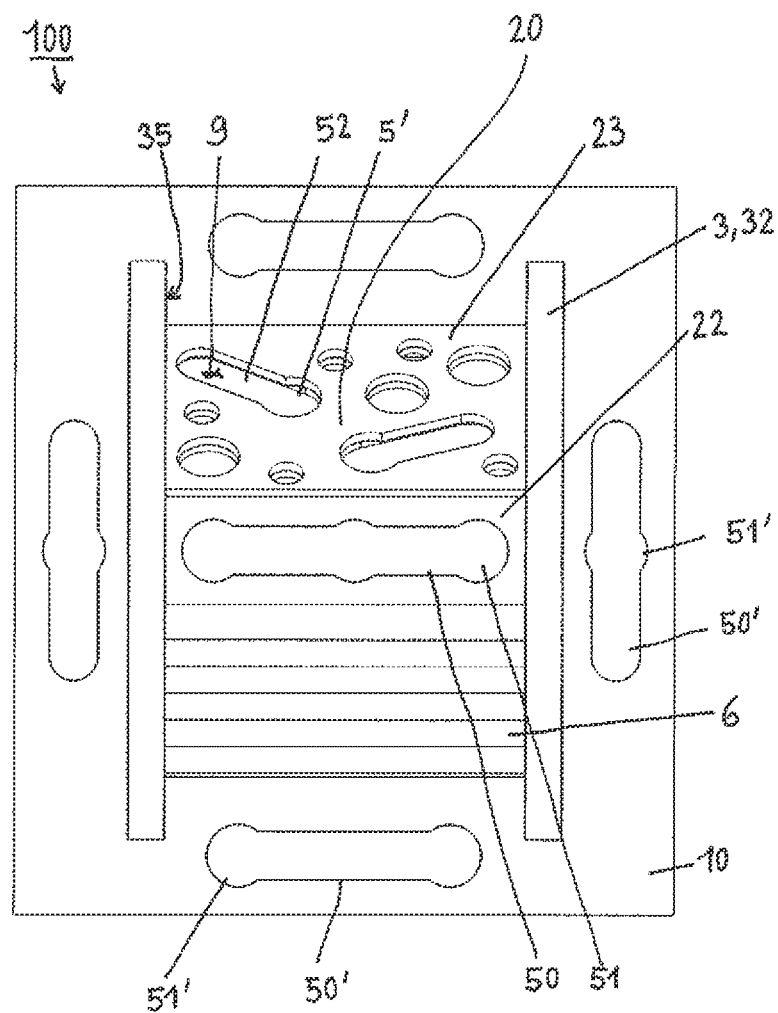

With all identifying numbers and descriptions remaining the same, the view from above in FIG. 3 clearly shows shell plates 21, 23 with their various oblong and circular recesses 5, and how these are bound on both sides by flank plates 3 with their cover strips 32. The oblong recesses 5 are formed by undercuts which can hold locking dowels 8 in recesses 5. Extensions 5' do not feature undercuts, so dowels 8 can be removed from there and the dog can reach a treat placed there.

Furthermore, FIG. 3 shows base plate 10 with undercut recesses 50' and their circular extensions 51', which are not undercut. Dowels 8 can be fixed into these recesses 50' so that they cannot be removed.

Figure 4:
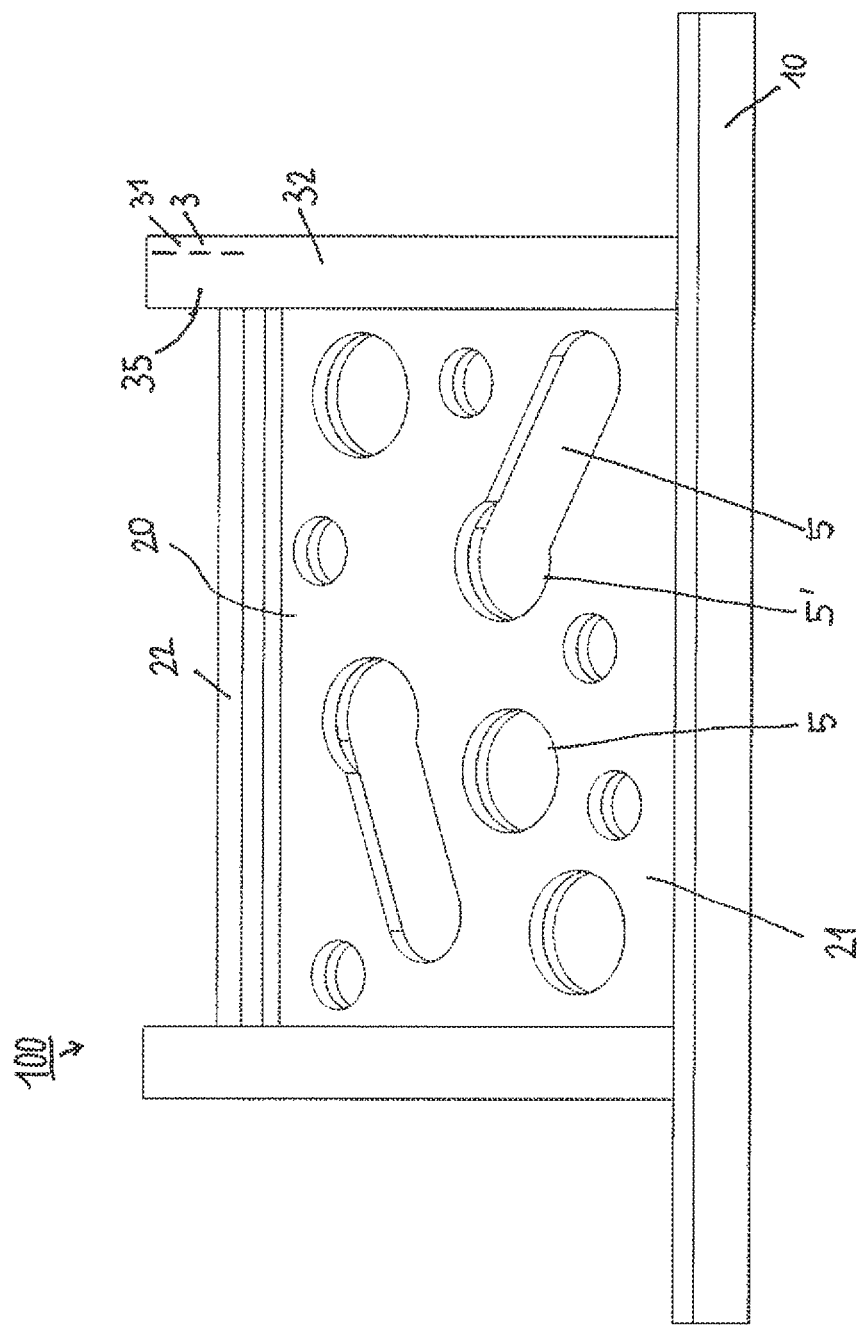

With all identifying numbers and descriptions remaining the same, FIG. 4 gives a frontal view of the new game for dogs 100, with base plate 10, the shell plate 21 sloping upwards with its various oblong and circular recesses 5—beneath which edible rewards 9 can be placed for the dog to find and get them out, e.g. with its tongue. These edible rewards will it feel good and motivate it. FIG. 4 also shows the two flank plates with their cover strips 32, which bound or cover both channels 35.

This figure clearly shows floors 52 arranged beneath recesses 5, on which the edible rewards 9 can be placed.

Figure 5:
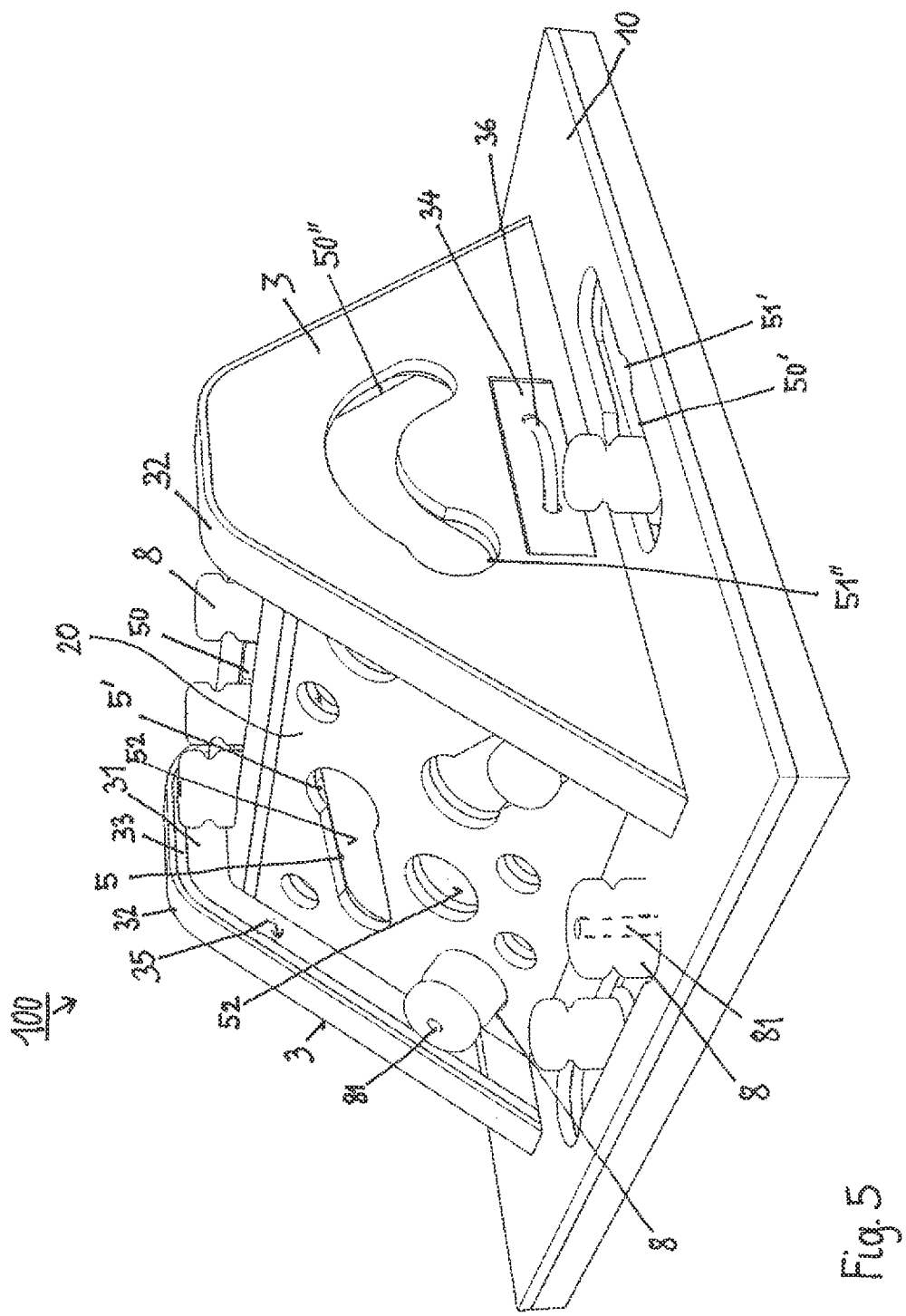

With all identifying numbers and descriptions remaining the same, FIG. 5 shows the new game for dogs 100 with dowels 8 arranged in recesses 50, 50', 50" and the "lockable" recesses 5 of shell plates 21, 22, 23.

Only after the dog has first removed the three locking dowels from recess 50 can it push the cylinders 6, which cannot be seen at first, over to shell plate 23.

However, dowel 8 placed in recess 5 in shell plate 23 prevents the cylinders 6, which the dog has moved or rolled over from the other side of prism 20, from rolling down completely.

Therefore the dog has to remove dowel 8 from the recess, and only then does it find its first edible treat here.

However, one of cylinders 6 could for instance still keep a recess 5 on shell plate 21 on the other side of prism 20 locked and therefore make a treat placed beneath inaccessible.

After removing dowel 8 mentioned above, the dog has already become intelligent enough to move all cylinders 6 from shell plate 21 on the other side across peak plate 22 in order to open a recess 5 in shell plate 21 that has been kept locked by at least one of the cylinders 6. Here it is rewarded for a second time by reaching treat 9 placed beneath. This is an example of how the dog has achieved particularly high competence, for which it is rewarded appropriately.

This new game is a challenging intelligence game for medium-size and large dogs.

The game can be set from easy (difficulty level 1 Paw) to very difficult (4 Paws). It offers a variety of obstacles that the dog has to solve in order to reach the hidden rewards. This game trains a dog's concentration and dexterity, and encourages its natural instincts, especially curiosity, drive to play and sense of smell. With its many varieties of settings, this game is suitable for beginners as well as advanced players.

In this game there are up to 27 different hiding places that the dog can discover: dowels 8 with protruding "lower extensions that work with the undercuts of extensions 5', 50, 50', 50", 9 dowels, 2 drawers and 6 cylinders.

It is recommended to start the game with just cylinders 6, and without blocking recesses 50 on peak plate 22. If after a few attempts the dog cannot solve the puzzle it may lose motivation. Let the dog watch as you hide the treats in order to stimulate its curiosity, and show it how the game works. This way you can make sure that your dog enjoys playing the game together with you and can solve the task. This will strengthen your dog's self-confidence.

It is best not to let your dog play unsupervised, and you should intervene if it starts to chew pieces of the game.

As an added benefit, this new game is made of FSC® certified wood covered in a water-based varnish that is not harmful to humans and animals. It significantly adds to the provision of a meaningful and appropriate activity for dogs that encourages their natural instincts. The bond between dog and owner is strengthened, and many types of behavioral problems can be resolved or stopped.

The invention claimed is:
1. A toy for dogs, the toy comprising:
a level base plate and a hollow prism body disposed on said base plate, said prism body being formed of a plurality of shell plates and having a triangular, trapezoid or cylindrical horizontal cross-section;
said shell plates including inclined shell plates sloping upwards from said base plate and a peak plate and said shell plates having recesses formed therein, and a floor surface at a vertical distance from each said recess, where a treat for a dog may be placed so that the dog can reach the treat; and
substantially vertical, parallel flank plates bounding said prism body on two sides thereof, said flank plates projecting over said shell plates or parts thereof at a constant height throughout and having protruding inner surfaces facing each other and being formed with a channel that substantially follows a contour of an outer surface of said shell plates or parts thereof;
a plurality of slide elements selected from the group consisting of sticks, bars, cylinders and dowels movably disposed in said channels and extending between said flank plates, said slide elements covering at least one of said recesses in said shell plates or parts thereof, wherein said slide elements are configured to move one by one or in groups from one shell plate across the peak plate or part thereof to an opposite said shell plate or part thereof to open at least one recess and enable access to the treat hidden beneath.

2. The toy according to claim 1, wherein said slide elements are formed with protruding end discs configured for placement in said channels formed in said protruding inner surfaces of said end plates.

3. The toy according to claim 1, wherein said channels are continuous grooves in said protruding inner surfaces of said flank plates, substantially following the contour of said shell plates or parts thereof over said peak plate or a part thereof, with said slide elements projecting into said channels.

4. The toy according to claim 1, wherein said channels are formed by mutually facing undercut inner surfaces of said flank plates and boundary-setting cover strips attached to outer edges of said flank plates with undercut profile strips, and each said slide element having two ends equipped with circular discs supported directly at an outer surface of said prism body.

5. The toy according to claim 1, wherein said channels for said slide elements are set on both sides at a vertical distance from said base plate, so that a lowermost of said slide elements is held at distance sufficient for the dog playing with the toy can reach underneath.

6. The toy according to claim 1, wherein said slide elements are sufficient in number so that, when said slide elements lie lengthwise along each other said slide element cover one of said sloping shell plates or shell plate parts covering said prism body, and thereby covering said recesses there.

7. The toy according to claim 1, wherein said slide elements have a circular cylindrical or polygonal shape.

8. The toy according to claim 7, wherein said slide elements have an octagonal cross-sectional shape.

9. The toy according to claim 1, wherein said channels are grooves maintaining a uniform width, depth and cross-sectional shape throughout a course thereof.

10. The toy according to claim 1, wherein said channels are grooves with a rectangular or semi-circular cross-sectional shape.

11. The toy according to claim 1, further comprising at least one dowel or knob formed with a smell channel running there through, said dowel or knob being configured for locking a recess holding at least one treat and for blocking a movement of said slide elements, wherein movement of said dowel or knob unblocks the slide elements and enables access to the recess holding at least one treat.

12. The toy according to claim 11, further comprising two drawers configured to be pulled out of said flank plates, and to be filled with at least one treat, and wherein said drawers are also blocked by said dowels or knobs so that, removal of said dowels or knobs unblocks said drawers and enables said drawers to be pulled out and access to the least one treat contained therein.

13. The toy according to claim 12, wherein said drawers have a drawer pull enabling said drawers to be pulled out from a storage recess in said base plate.

14. The toy according to claim 1, wherein one or more of said base plate, said flank plates or said peak plate are formed with partially undercut recesses for holding dowels or knobs, with only a limited area of said recesses not being undercut, so that, movement of the dowel or knob into the area that is not undercut, enables the movement of a particular drawer from said flank plate and access of the treat kept within.

\* \* \* \* \*